United States Patent [19]
Takizawa et al.

[11] Patent Number: 6,135,917
[45] Date of Patent: Oct. 24, 2000

[54] SPEED RATIO CONTROLLER AND CONTROL METHOD OF AUTOMATIC TRANSMISSION

[75] Inventors: Satoshi Takizawa; Masato Koga; Mitsuru Watanabe, all of Kanagawa, Japan

[73] Assignee: Nissan Motor Co., Ltd., Yokohama, Japan

[21] Appl. No.: 09/358,485

[22] Filed: Jul. 22, 1999

[30] Foreign Application Priority Data

Jul. 24, 1998 [JP] Japan .................................. 10-209783

[51] Int. Cl.[7] .......................... F16H 61/00; F16H 15/00; F16H 9/00
[52] U.S. Cl. ................................................. 477/98
[58] Field of Search .......................... 477/97, 98

[56] References Cited

U.S. PATENT DOCUMENTS

| | | | |
|---|---|---|---|
| 4,566,354 | 1/1986 | Kumura et al. | 477/98 |
| 4,807,495 | 2/1989 | Wallace | 477/98 |
| 4,817,469 | 4/1989 | Shigematsu et al. | 477/98 |
| 4,982,622 | 1/1991 | Yamamoto et al. | 477/98 |
| 5,024,125 | 6/1991 | Baba | 477/98 |
| 5,069,084 | 12/1991 | Matsuno et al. | 477/98 |
| 5,131,293 | 7/1992 | Kaiser et al. | 477/98 |
| 5,609,544 | 3/1997 | Lardy et al. | 477/46 |
| 5,669,845 | 9/1997 | Muramoto et al. | 475/186 |
| 5,676,619 | 10/1997 | Ohashi et al. | 477/98 |

FOREIGN PATENT DOCUMENTS 7-167284  7/1995  Japan .

*Primary Examiner*—Dirk Wright
*Attorney, Agent, or Firm*—Foley & Lardner

[57] ABSTRACT

A speed ratio controller for a continuously variable transmission comprises a sensor (66) for detecting the activation of a catalyst purifying the exhaust gas of the engine, a sensor (62) for detecting an engine load, a sensor (63) for detecting a vehicle speed and a microprocessor (61) for controlling the transmission. The microprocessor (61) stores a first speed change map defining a speed ratio of the transmission according to the vehicle speed and engine load, and a second speed change map defining a larger speed ratio than the speed ratio defined in the first speed change map in a range where the vehicle speed is lower than a predetermined vehicle speed and the engine load is lower than a predetermined engine load. In order to determine the speed ratio of the transmission, the microprocessor (61) applies the first speed change map until the catalyst is activated and the second speed change map after the catalyst is activated.

4 Claims, 13 Drawing Sheets

SPEED RATIO CONTROLLER AND CONTROL METHOD OF AUTOMATIC TRANSMISSION

FIELD OF THE INVENTION

This invention relates to speed ratio control of a continuously variable transmission of a vehicle provided with a gasoline engine.

BACKGROUND OF THE INVENTION

The exhaust purification catalyst for a vehicle engine can not fully perform at a low temperature.

In order to cope with this situation, Tokkai Hei 7-167284 published by Japanese Patent Office in 1995 discloses a method to prevent an automatic transmission from using a highest gear e.g., overdrive gear, when the temperature of the exhaust purification catalyst is low. This arrangement results in the increase the engine rotation speed that promotes the activation of the catalyst.

SUMMARY OF THE INVENTION

When the vehicle is provided with a continuously variable transmission which is disclosed in U.S. Pat. No. 5,669,845, however, the above method is not effective for the following reasons.

In a vehicle provided with a continuously variable transmission, the engine rotation speed when the vehicle speed is low is lower than that of the vehicle provided with an automatic transmission other than a continuously variable transmission. In the case of a vehicle with a continuously variable transmission, therefore, simply preventing the transmission from using a small speed ratio does not sufficiently increase the engine speed to activate the catalyst, especially when the vehicle speed and engine load are low. The speed ratio denotes the ratio of the input rotation speed and the output rotation speed of the transmission.

It is therefore an object of this invention to sufficiently increase the engine rotation speed of a vehicle provided with a continuously variable transmission when the catalyst temperature is low.

It is another object of this invention to prevent an undesired shifting action of the transmission in the above engine speed increasing operation.

In order to achieve the above objects, this invention provides a speed ratio controller for a continuously variable transmission of a vehicle, wherein the vehicle is provided with an engine responsive to an operation of a throttle and a catalyst for purifying exhaust gas of the engine. This catalyst is activated at a temperature higher than a predetermined catalyst temperature. The continuously variable transmission transmits a rotation of the engine to a drive wheel at an arbitrary speed ratio according to the control by the controller. The controller comprises a sensor for detecting an activation of the catalyst, a sensor for detecting an engine load, a sensor for detecting a vehicle speed, and a microprocessor programmed to select a first speed change map when the catalyst is activated, the first speed change map defining a speed ratio according to the vehicle speed and engine load, select a second speed change map when the catalyst is not activated, this second map defining a larger speed ratio than the speed ratio defined in the first speed change map in a range where the vehicle speed is lower than a predetermined vehicle speed and the engine load is lower than a predetermined engine load, and control the speed ratio of the continuously variable transmission based on a selected speed change map.

This invention also provides a speed ratio control method for a continuously variable transmission of a vehicle, wherein the vehicle is provided with an engine responsive to an operation of a throttle and a catalyst for purifying exhaust gas of the engine. The catalyst is activated at a temperature higher than a predetermined catalyst temperature. The continuously variable transmission transmits a rotation of the engine to a drive wheel at an arbitrary speed ratio. The control method comprises detecting an activation of the catalyst, detecting an engine load, detecting a vehicle speed, selecting a first speed change map defining a speed ratio with respect to the vehicle speed and engine load, when the catalyst is activated, selecting a second speed change map when the catalyst is not activated, this second map defining a larger speed ratio than the speed ratio defined in the first speed change map in a range where the vehicle speed is lower than a predetermined vehicle speed and the engine load is lower than a predetermined engine load, and controlling the speed ratio of the continuously variable transmission based on a selected speed change map.

The details as well as other features and advantages of this invention are set forth in the remainder of the specification and are shown in the accompanying drawings.

DESCRIPTION OF THE PREFERRED EMBODIMENTS

Figure 1:
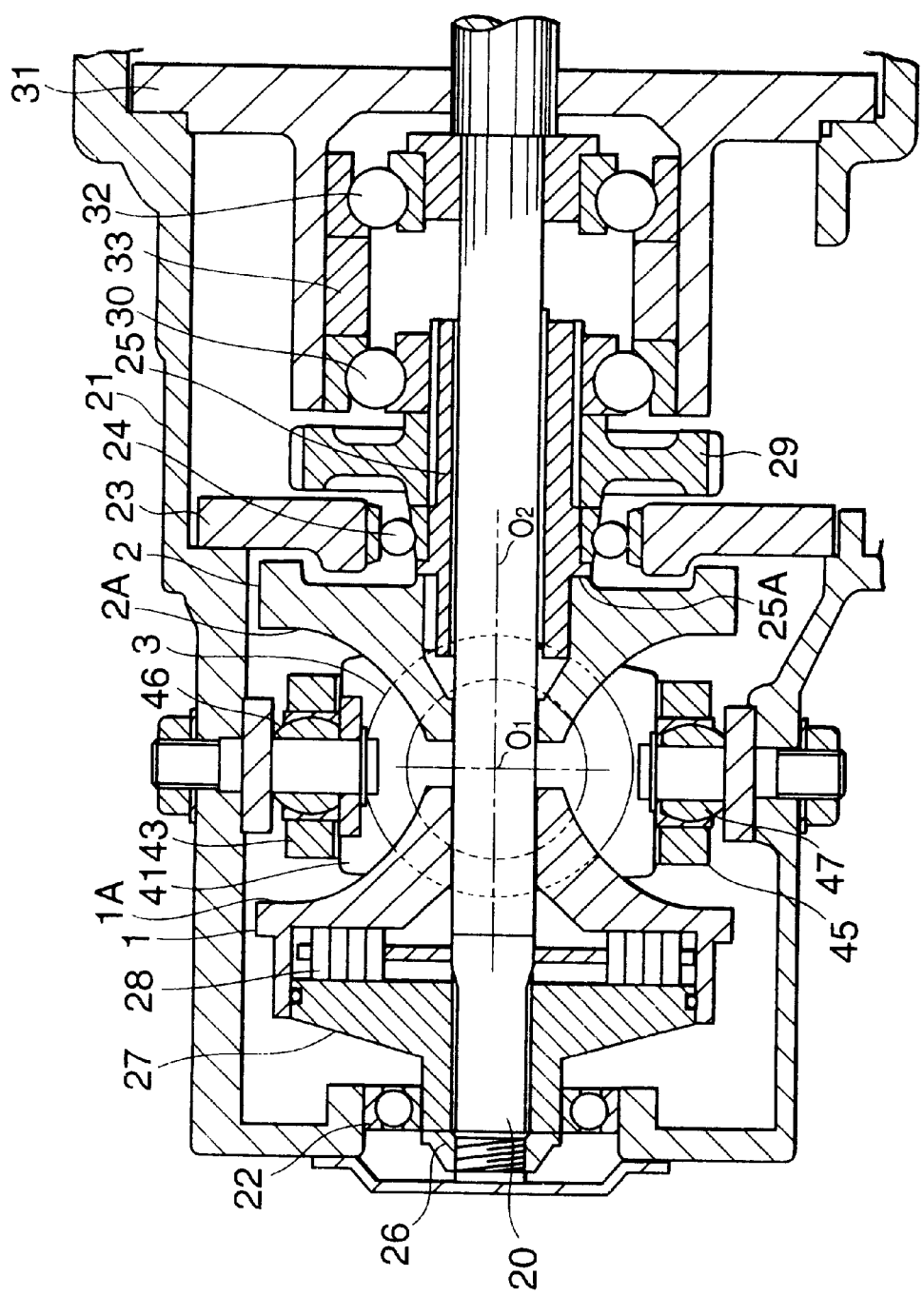
FIG. 1 is a longitudinal sectional view of a toroidal continuously variable transmission to which this invention is applied.

Referring to FIG. 1 of the drawings, a toroidal continuously variable transmission to which this invention is applied comprises an input shaft 20 and an output gear 29.

The input shaft 20 is connected to an engine of a vehicle via a torque converter. The engine and the torque converter are located on the right side of FIG. 1, but not shown. The output gear 29 outputs a rotation torque for driving the vehicle. The exhaust gas of the engine is discharged to the atmosphere via a exhaust pipe not shown and a catalytic converter interposed therein for the purification of the exhaust gas.

A cam flange 27 screws in to the tip of the input shaft 20. A nut 26 is tightened to the tip of the input shaft 20 so that the cam flange 27 is fixed to the input shaft 20.

The cam flange 27 is inserted in a cylindrically shaped back side part of an input disk 1. The input shaft 20 passes through the center of the input disk 1 leaving a small clearance. By this arrangement, the input disk 1 is maintained coaxial with the rotation shaft 20. The cam flange 27 is supported in a case 21 via a bearing 22, and the base end of the input shaft 20 is supported by an angular bearing 32.

A cam roller 28 is disposed between the cam flange 27 and the input disk 1. The cam roller 28 comprises a cam surface which presses the input disk 1 to the right of the figure according to the relative rotational displacement of the cam flange 27 and the input disk 1.

An output disk 2 is attached free to rotate relative to the input disk 1 on the outer circumference of the rotation shaft 20.

The input disk 1 and power output disk 2 comprise toroidal curved surfaces 1A, 1B which face each other, and a pair of power rollers 3 is gripped between these curved surfaces 1A, 1B.

The output disk 2 is spline jointed to a sleeve 25 supported on the outer circumference of the rotation shaft 20 via a needle bearing. A large diameter part 25A is formed in the sleeve 25 to support a thrust load which interacts on the power output disk 2 towards the right of FIG. 1.

The sleeve 25 is supported by an intermediate wall 23 of the case 21 via a radial bearing 24, and is also supported by an angular bearing 30. The angular bearing 30 and an angular bearing 32 are engaged inside a cylindrically-shaped cover 31 fixed to the case 21.

A spacer 33 which engages with the inside of the cover 31 is also gripped by the angular bearings 30, 32.

The thrust force exerted by the input disk 1 on the rotation shaft 3 towards the left of the drawing, and the thrust force exerted by the output disk 2 on the sleeve 25, therefore cancel each other out due to the spacers 33 gripped between the angular bearings 30, 32. Also, the load which acts on the angular bearings 30, 32 in the radial direction is supported by the cover 31.

The output gear 29 is spline jointed to the outer circumference of the sleeve 25. The rotation of the output gear 29 is transferred to the outside of the case 21 via a gear unit, not shown.

The power rollers 3 are supported by trunnions 41.

By driving the trunnions 41 in a direction perpendicular to the rotation shaft 20, the contact positions of the power rollers 3 with the input disk 1 and output disk 2 are changed. Due to this change of contact positions, a force is exerted on the power rollers 3 by the disks 1 and 2 so as to rotate the power rollers 3 around the axis $O_3$ which causes the gyration angle of the power rollers 3 to vary. As a result, the distance of the contact point between the power rollers 3 and the input disk 1 from the rotation shaft 20, and the distance of the contact point between the power rollers 3 and the output disk 2 from the rotation shaft 20, vary, and a speed ratio varies accordingly. Herein, the speed ratio denotes the rotation speed of the input disk 1 divided by the rotation speed of the output disk 2

Figure 2:
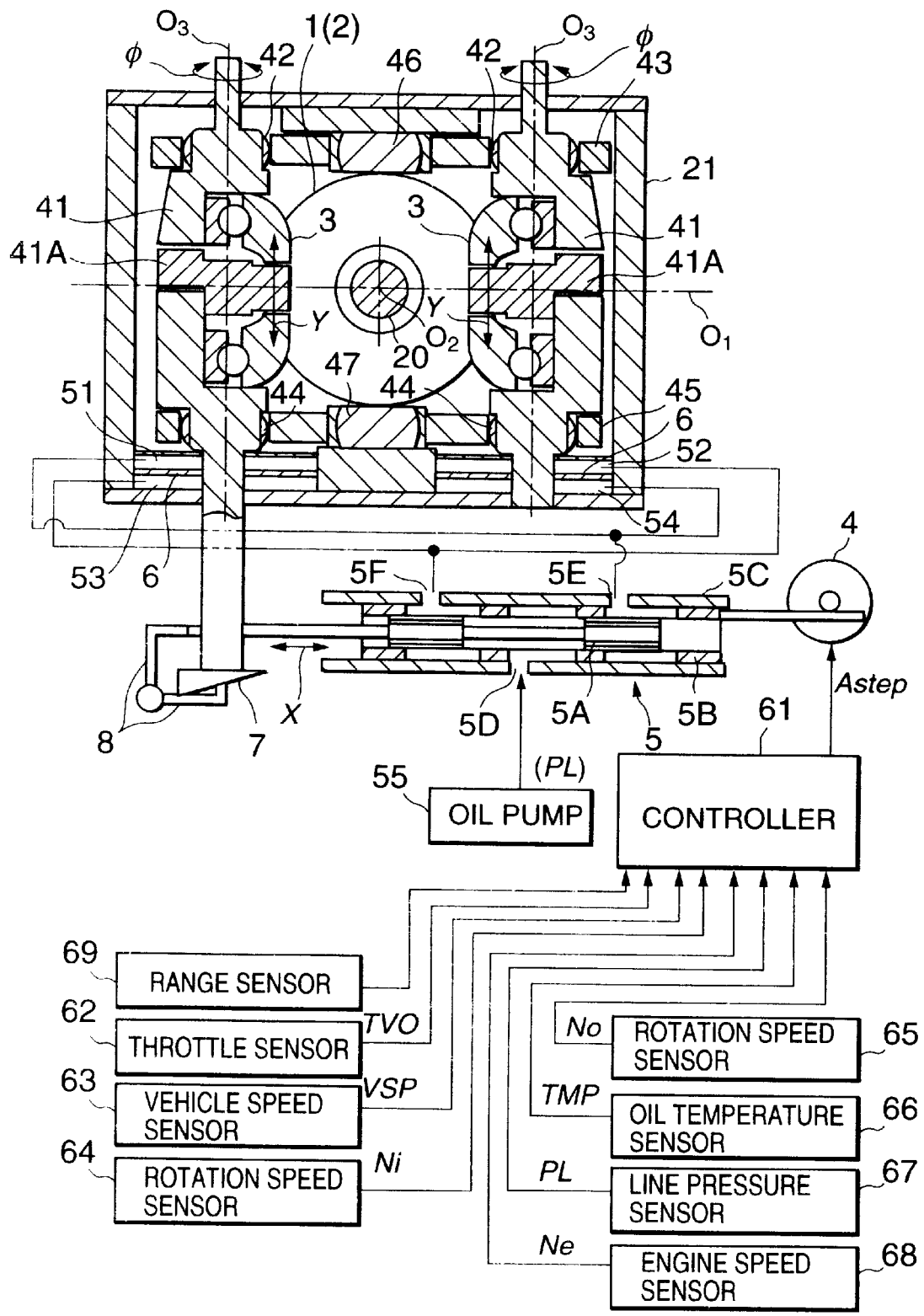
FIG. 2 is a schematic diagram of a speed ratio control device according to this invention.

As shown in FIG. 2, the trunnions 41 support the power rollers 3 such that they are free to rotate about an axis $O_1$ shown in FIG. 2 via a crank-shaped shaft 41A, and such that they are free to swing within a small range around the base end of the shaft 41A.

The upper end of each trunnion 41 is joined to an upper link 43 via a spherical joint 42, and a lower end is joined with a lower link 45 via a spherical joint 44. The upper link 43 and lower link 45 are supported in the case 21 via spherical joints 46 and 47, respectively. Due to these links, the pair of trunnions 41 always displaces in reverse directions and by an equal distance along an axis $O_3$ shown in FIG. 2.

A piston 6 is fixed to each of these trunnions 41. The piston 6 displaces the trunnion 41 along the axis $O_3$ according to an oil pressure balance of oil chambers 51, 53 and oil chambers 52, 54 which are formed in the case 21. Oil pressure is supplied to these oil chambers 51, 52, 53, and 54 from an oil pressure control valve 5.

The oil pressure control valve 5 comprises an outer sleeve 5C, inner sleeve 5B and a spool 5A which slides on the inside of the inner sleeve 5B. A port 5D which draws the pressure of an oil pump 55, port 5E connected to the oil chambers 51, 54, and port 5F connected to the oil chambers 52, 53 are formed in the outer sleeve 5C, respectively. The inner sleeve 5B is connected with a step motor 4 via a rack and pinion. Also, openings at the ends of the inner sleeve 5B are connected to drain passages, not shown.

The spool 5A is joined to a link 8. The link 8 displaces the spool 5A according to a rotational displacement around the axis $O_3$ and a displacement along the axis $O_3$ of a precess cam 7 fixed to the lower end of one of the trunnions 41, and mechanically feeds back the gyration angle of the power roller 3 to the oil pressure control valve 5.

The oil pressure control valve 5 changes the pressure supplied to the ports 5E, 5F according to a command signal Astep input to the step motor 4 from the controller 61.

For example, when the spool 5A, outer sleeve 5B and inner sleeve 5C are in the positions shown in FIG. 2, the oil chambers 52, 53 receive high pressure oil of an pressure pump 55 from the port 5F, and oil in the oil chambers 51, 54 is drained via the port 5E.

As a result, the trunnion 41 on the left of the figure moves upwards along the axis $O_3$, and the trunnion 41 on the right of the figure moves downwards along the axis $O_3$. Hence, the rotation axis $O_1$ of the power roller 3 displaces from a neutral position at which it intersects a rotation axis $O_2$ of the input disk 1 and the output disk 2, i.e., the center of the rotation shaft 20, in the direction shown by the arrow Y in the drawing.

Due to this displacement, the input disk 1 and output disk 2 cause the power roller 3 together with the trunnions 41 to perform a rotational displacement around the axis $O_3$ and thereby continuously vary the speed ratio.

At this time, the precess cam 7 fixed to the lower end of one trunnion 41 feeds back the displacement amount in the direction of the axis $O_3$ of the trunnion 41 and the rotational displacement of the power roller 3 around the axis $O_3$, to the oil pressure control valve 5 via a link 8, and the spool 5A is displaced in the direction shown by the arrow X in the drawing.

When a speed ratio corresponding to the above-mentioned command signal Astep is attained by this feedback operation, the positional relationship of the spool 5A and inner sleeve 5B is restored to the neutral position wherein inflow and outflow of oil to and from all the oil chambers is stopped.

Hence, the trunnions 41 are maintained in a state where they are displaced in the direction of the axis $O_3$.

On the other hand, the power roller 3 which performed a rotational displacement around the $O_3$ axis pivots on the base end of the shaft 41A while maintaining the new gyration angle, and returns to the neutral position at which the axis $O_1$ and the axis $O_2$ intersect.

The reason why the precess cam 7 feeds back not only the rotational displacement around the axis $O_3$ of the power roller 3, i.e., the gyration angle, but also the axial displacement of the trunnion 41, is that the feedback of the axial displacement of the trunnion 41 works as a damping element which prevents the speed ratio control from oscillating. The command signal Astep is determined by the controller 61.

The controller 61 comprises a microprocessor comprising a central processing unit (CPU), random access memory (RAM), read-only memory (ROM) and input/output interface (I/O interface).

Signals are input to the controller 61 from a throttle sensor 62 which detects a throttle opening TVO of the engine, vehicle speed sensor 63 which detects a vehicle speed VSP, rotation speed sensor 64 which detects a rotational speed Ni of the input disk 1, rotation speed sensor 65 which detects a rotational speed No of the output disk 2, oil temperature sensor 66 which detects a temperature TMP of the above-mentioned oil, line pressure sensor 67 which detects a line pressure $P_L$, i.e., the oil pressure which the port 5D supplies from the oil pressure pump 55, engine speed sensor 68 which detects a rotation speed Ne of the engine, and a range sensor 69 which detects an operating mode of the transmission chosen by a selector lever, not shown.

The selector lever is a control unit attached to the continuously variable transmission to allow the driver to choose the operating mode of the continuously variable transmission, one range being chosen from plural candidates including a forward travel range, forward sport travel range, reverse range, neutral range, and parking range. The controller 61 outputs the command signal Astep computed as described below, to the motor 4 based on the above-mentioned signals.

Figure 3:
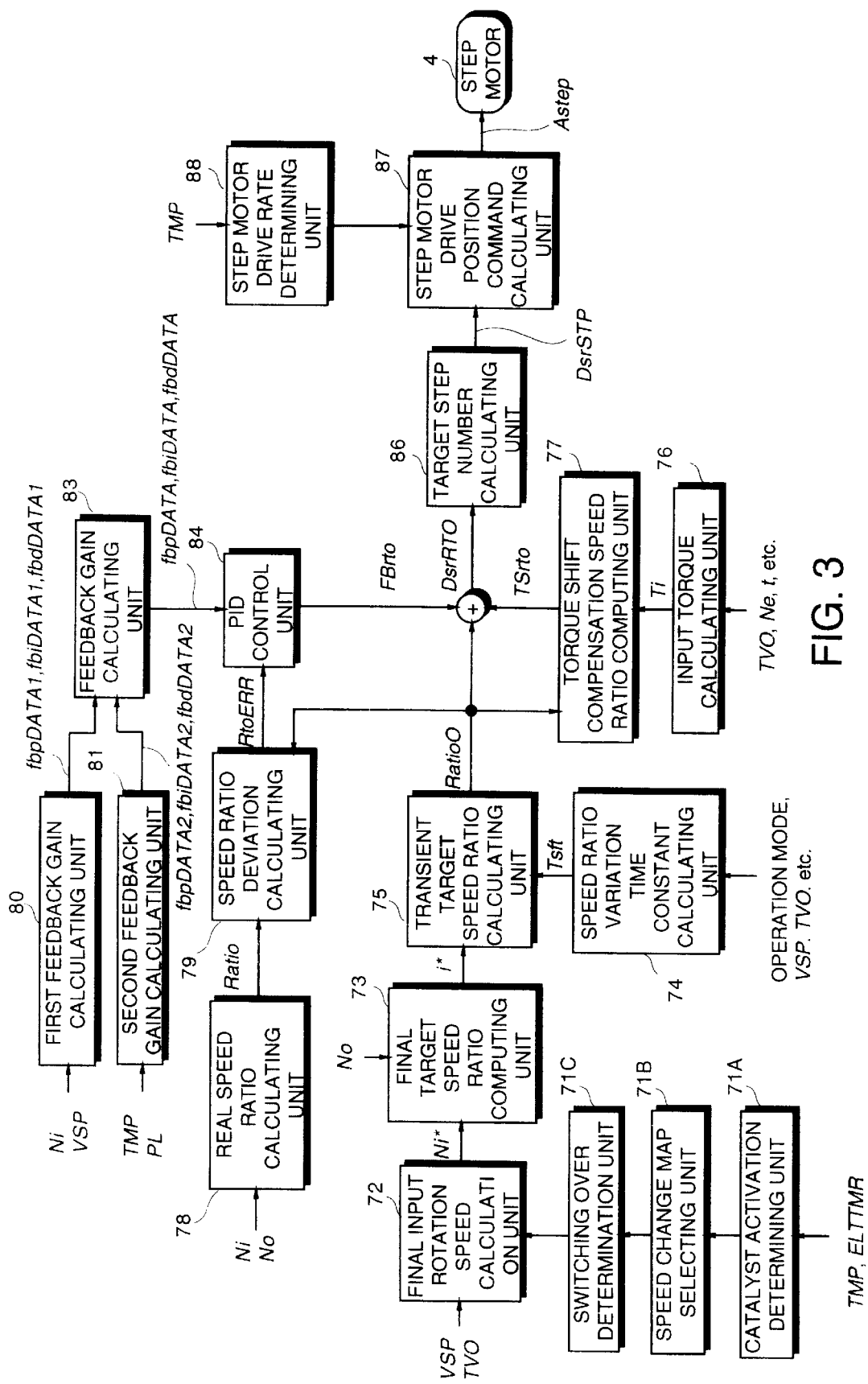
FIG. 3 is a block diagram for describing the structure of a controller according to this invention.

For this purpose, the controller 61 comprises processing units shown in FIG. 3. These units are virtual units constructed from the functions of the above-mentioned CPU, read-only memory and random access memory.

A catalyst activation determining unit 71A determines if the activation of a catalyst in the aforesaid catalytic converter is required based on the temperature TMP of the oil in the transmission at the time of engine start up and an elapsed time from the engine start up.

Figure 12:
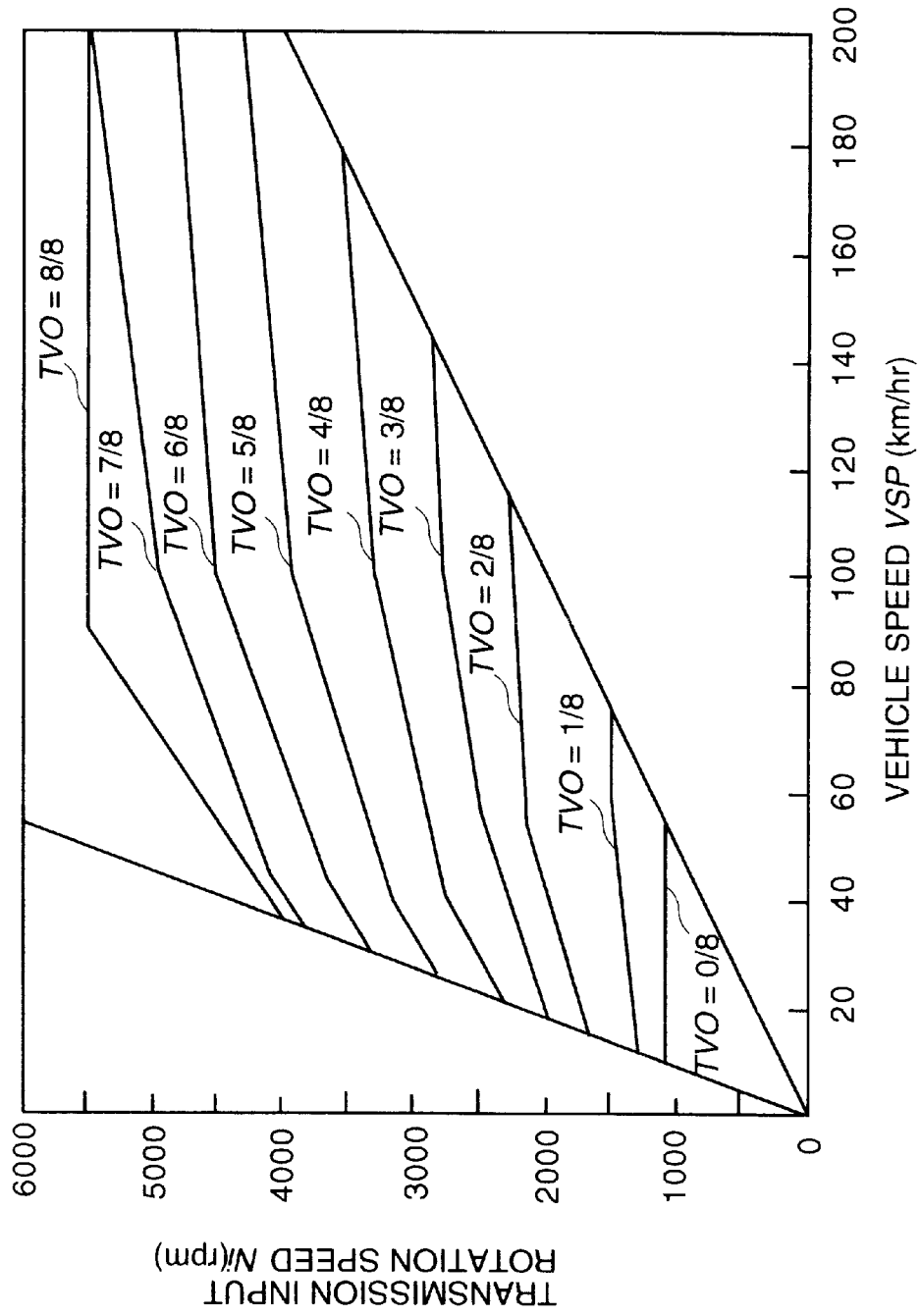
FIG. 12 is a diagram explaining the contents of the speed change map for normal running stored by the controller.
Figure 13:
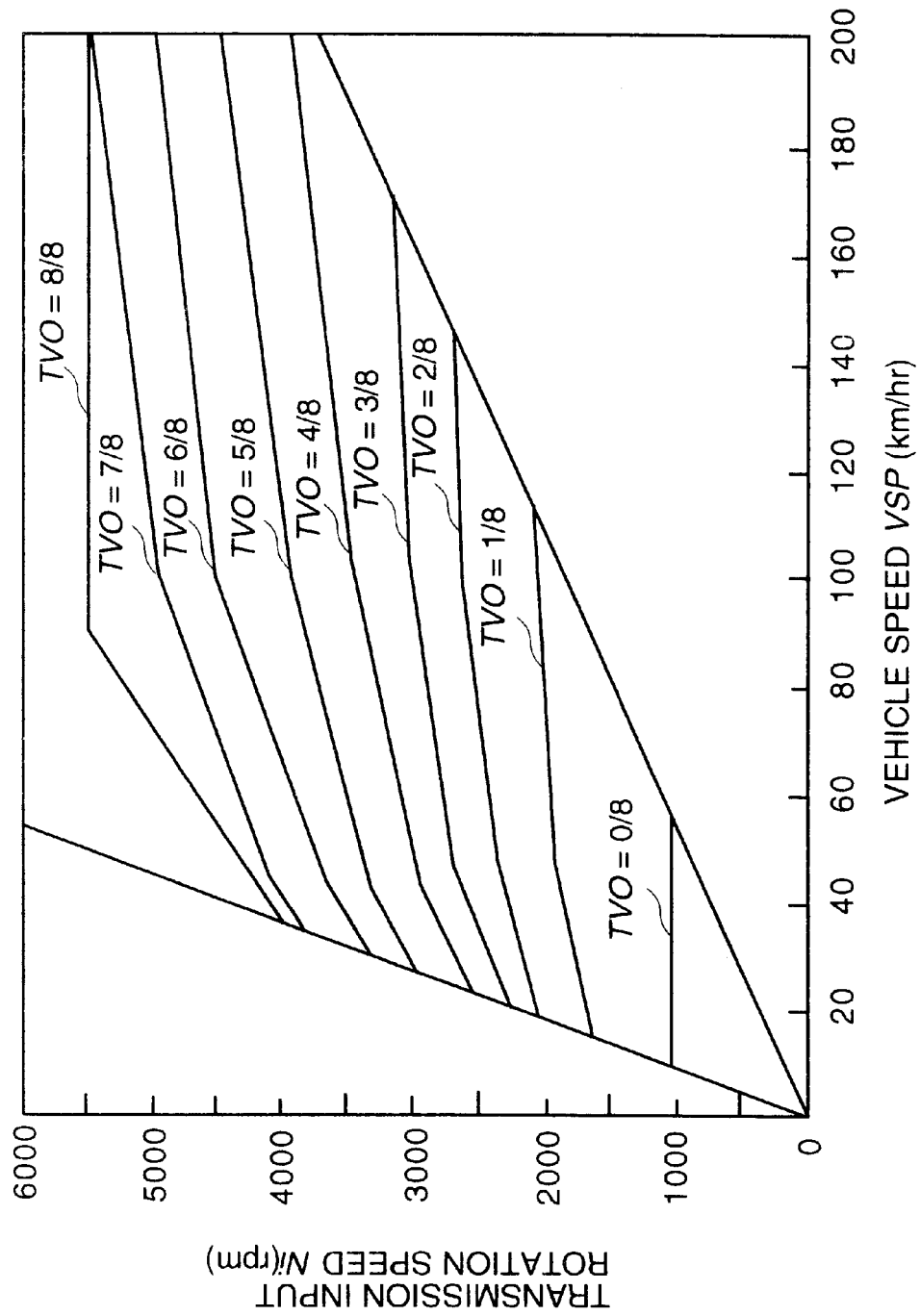
FIG. 13 is a diagram explaining the contents of the speed change map for catalyst activation stored by the controller.

A speed change map selecting unit 71B selects either of a speed change map for normal running shown in FIG. 12 and a speed change map for catalyst activation shown in FIG. 13 according to the determination result of the catalyst activation determining unit 71A.

Switching over determination unit 71C calculates final target input rotation speeds Ni* by respectively applying the above two maps and the difference thereof, and when the difference falls bellow a predetermined standard deviation, the switching over determination unit 71C switches over the maps from one to another. Herein, the final target input rotation speed denotes a target value of the input rotation speed of the transmission under the steady running state and is calculated based on an engine load and the vehicle speed VSP. In this control device, the throttle opening TVO detected by the throttle sensor 62 is used as a value representing the engine load. The vehicle speed VSP is detected by the vehicle speed sensor 63 as described above.

A final input rotation speed calculation unit 72 calculates the final target input rotation speed Ni* of the transmission based on the speed change map that is currently effective.

A final target speed ratio computing unit 73 divides the final input rotation speed Ni* by a rotation speed No of the output disk 2 detected by the rotation speed sensor 65, and calculates a final target speed ratio i*.

A speed ratio variation time constant calculating unit 74 determines a time constant Tsft of a speed ratio variation based on the operating mode of the transmission detected by the range sensor 69, vehicle speed VSP, throttle opening TVO, and deviation between a real speed ratio and a transient target speed ratio which will be described later.

The time constant Tsft is a constant specifying the rate of speed ratio variation until the final target speed ratio i* is attained, but as the time constant Tsft is varied dynamically in this embodiment as mentioned above, it is actually treated as a variable. The transient target speed ratio calculating unit 75 calculates a transient target speed ratio Ratio0 as a target value for every control cycle from the final target speed ratio i* and time constant Tsft.

The input torque calculating unit 76 calculates an engine output torque from the throttle opening TVO and engine speed Ne, and calculates a torque ratio t of the torque converter from the speed ratio of the input rotation speed and output rotation speed of the torque converter. The engine output torque is then multiplied by the torque ratio so as to calculate a transmission input torque Ti.

A torque shift compensation speed ratio computing unit 77 calculates a torque shift compensation speed ratio TSrto for compensating a torque shift which is a phenomenon peculiar to a toroidal continuously variable transmission from the aforesaid transient target speed ratio Ratio0 and the transmission input torque Ti. This torque shift will now be described.

When the toroidal continuously variable transmission is operating, the input disk 1 and output disk 2 grip the power rollers 3. This grip pressure acts as force tending to keep the power rollers 3 away from the axis $O_1$, and it deforms the trunnions 41 which support the power rollers 3. The deformation of the trunnions 41 introduces an error into the feedback operation of the precess cam 7, and produces a discrepancy between the command signal Astep input into the step motor 4 and the actual speed ratio realized by the command signal. This phenomenon is known as the torque shift.

The magnitude of the torque shift therefore varies according to the transient target speed ratio Ratio0 and transmission input torque Ti. The torque shift compensation speed ratio computing unit 77 calculates the torque shift compensation speed ratio TSrto from the transient target speed ratio Ratio0 and transmission input torque Ti by looking up a map stored beforehand in the controller 61. The torque shift compensation speed ratio TSrto is input into an adder 85 together with the transient target speed ratio Ratio0 and a speed ratio feedback correction amount FBrto which is output from a PID control unit 84.

Next, the speed ratio feedback correction amount FBrto will be described.

To make the real speed ratio follow a target value Ratio0, the speed ratio feedback control performed by the controller 61 adds a correction to the signal output to the step motor 4. The correction is performed by software. The feedback control performed by the above-mentioned precess cam 7 is control performed with hardware so that the speed ratio of the continuously variable transmission coincides with the command signal Astep, and is therefore different from the feedback control performed by the controller 61.

In order to perform this feedback correction, a real speed ratio calculating unit 78 computes the real speed ratio Ratio of the transmission by dividing the input rotation speed of the transmission, i.e., the rotation speed Ni of the input disk 1, by the output rotation speed, i.e., the rotation speed No of the output disk 2. A speed ratio deviation calculating unit 79 subtracts the real speed ratio Ratio from the transient target speed ratio Ratio0 to calculate the speed ratio deviation RtoERR.

Based on the speed ratio deviation RtoERR, a first feedback gain calculating unit 80 sets a first feedback gain for feedback controlling the speed ratio on the basis of a proportional integral differential (PID) control known in the art.

The parameters set here are a first proportional control feedback gain fbpDATA1, first integral control feedback gain fbiDATA1 and first differential control feedback gain fbdDATA1 which are set based on the transmission input rotation speed Ni and the vehicle speed VSP, respectively.

To set these first feedback gains, a two-dimensional map of each first feedback gain with the transmission input rotation speed Ni and vehicle speed VSP as parameters is stored beforehand in the controller 61, and the first feedback gain computing unit 80 calculates these first feedback gains by looking up each map based on the transmission input rotation speed Ni and the vehicle speed VSP.

The second feedback gain calculating unit 81 sets a second feedback gain based on the transmission oil temperature TMP and the line pressure $P_L$. The parameters set here are a second proportional control feedback gain fbpDATA2, second integral control feedback gain fbiDATA2 and second differential control feedback gain fbdDATA2. These second feedback gains are also found by looking up maps stored beforehand in the controller 61.

A feedback gain calculating unit 83 then calculates the proportional control feedback gain fbpDATA, the integral control feedback gain fbiDATA and the differential control feedback gain fbdDATA by multiplying the first feedback gains by corresponding second feedback gains.

These feedback gains fbpDATA, fbiDATA and fbdDATA are input to the PID control unit 84 together with the speed ratio deviation RtoERR, calculated by the speed ratio deviation calculating unit 79.

A PID control unit 84 calculates a speed ratio feedback correction amount FBrto using the speed ratio deviation RtoERR and these feedback gains. For this purpose, a speed ratio feedback correction amount due to proportional control is found by multiplying the speed ratio deviation RtoERR by the gain fbpDATA, a speed ratio feedback correction amount due to integral control is found by multiplying the speed ratio deviation RtoERR by the gain fbiDATA, and a speed ratio feedback correction amount due to proportional control is found by multiplying the speed ratio deviation RtoERR by the gain fbdDATA. These are then substituted into the following PID control equation known in the art to calculate the speed ratio feedback correction amount FBrto.

$$FBrto = RtoERR \cdot fbpDATA + \left(\int RtoERR\right) \cdot fbiDATA + \left(\frac{d}{dt}RtoERR\right) \cdot fbdDATA$$

The adder 85 adds the torque shift compensation speed ratio TSrto and the speed ratio feedback correction amount FBrto to the transient target speed ratio Ratio0 to calculate a compensated transient target speed ratio DsrRTO.

A target step number calculating unit 86 calculates a target number of steps DsrSTP of the step motor 4 corresponding to the compensated transient target speed ratio DsrRTO by looking up a map stored beforehand in the controller 61.

On the other hand, a step motor drive rate determining unit 88 determines a physical operating limit rate of the step motor 4 based on the oil temperature TMP of the transmission.

A step motor drive position command computing unit 87 determines whether or not the step motor 4 can attain a target numbers of steps DsrSTP in the aforesaid speed ratio control cycle based on this physical operating limit rate. A value obtained by correcting the target step number DsrSTP based on the physical operating limit rate is set as the command signal Astep.

The command signal Astep is therefore considered to correspond to the actual rotation position of the step motor 4.

The above functions of the controller 61 are materialized by performing routines shown in the flowcharts of FIGS. 4–11.

Figure 4:
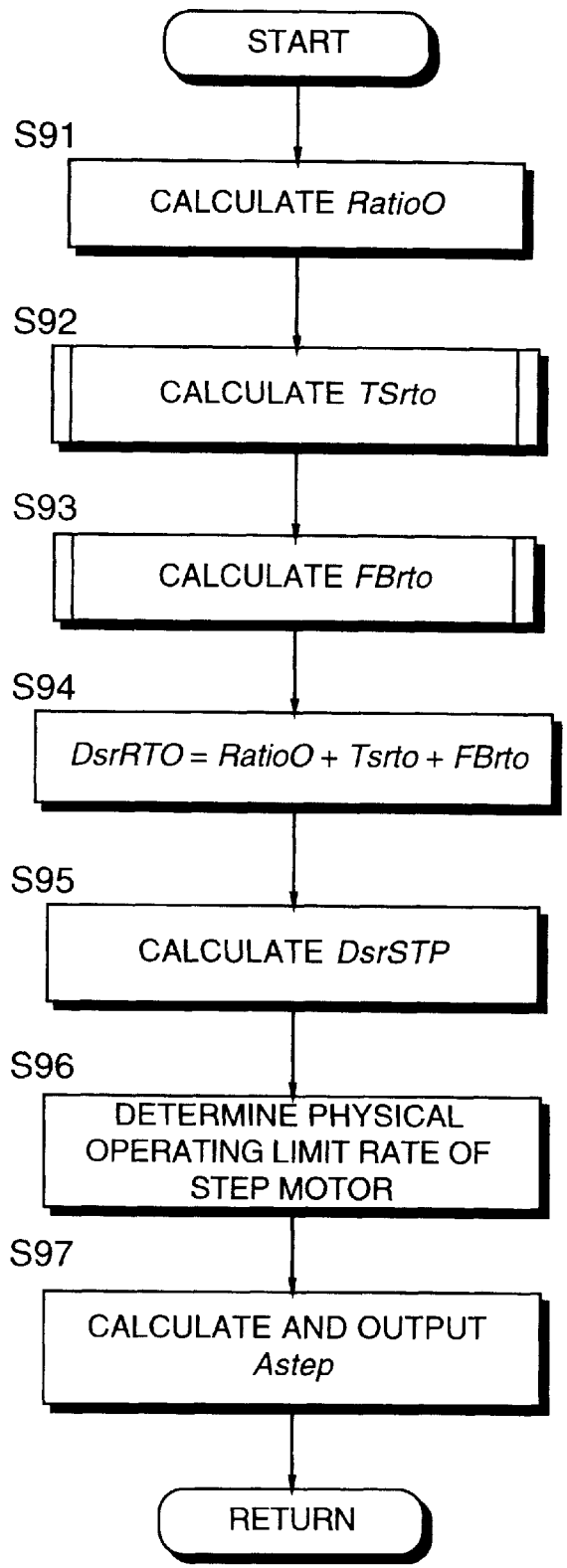
FIG. 4 is a flowchart describing a main routine of a speed ratio control performed by the controller.

FIG. 4 shows the flow of a main routine and FIGS. 5–11 show the flow of subroutines. All of these routines are repeatedly performed, for example, at an interval of 10 milliseconds.

Figure 5:
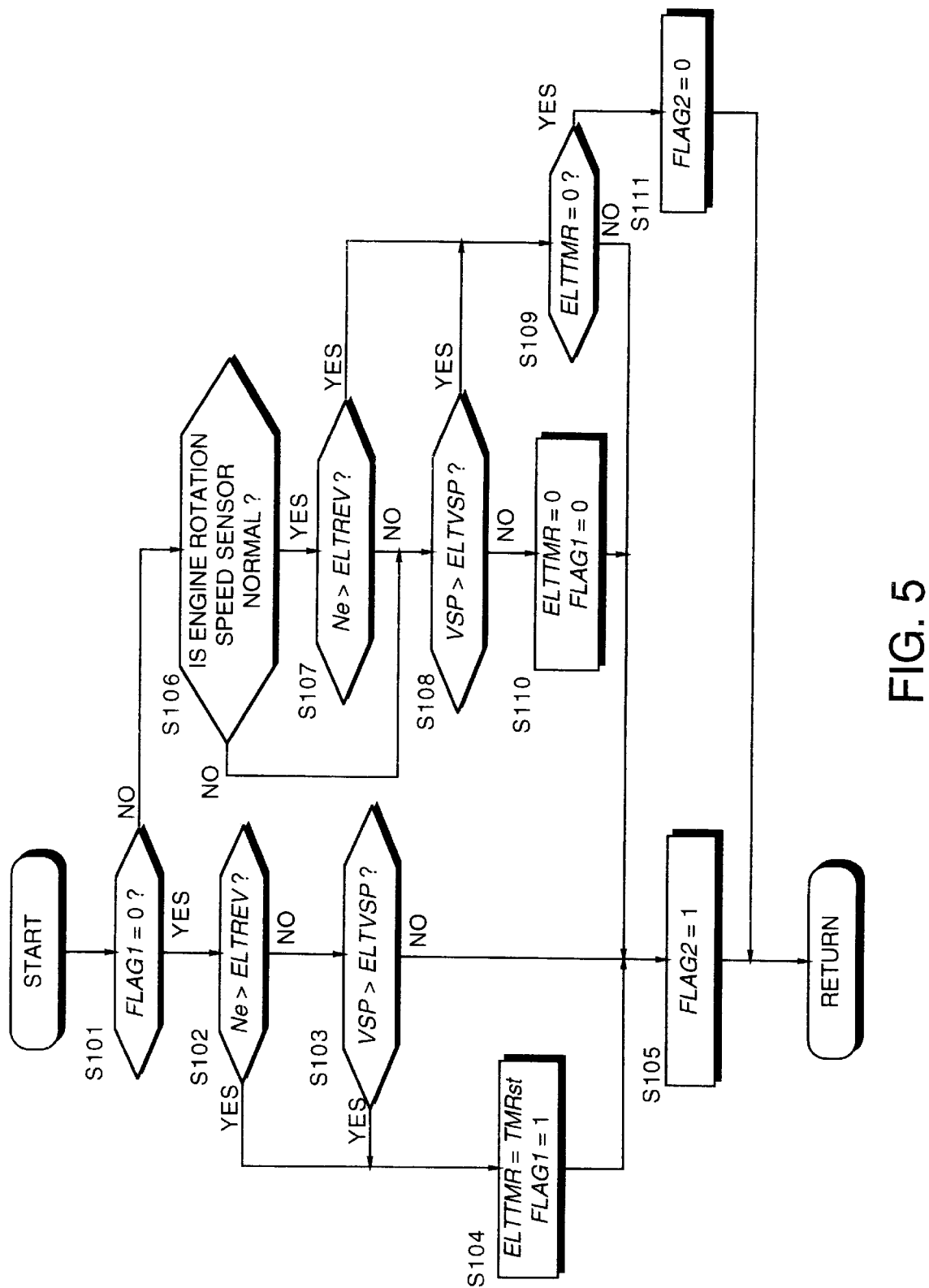
FIG. 5 is a flowchart describing a subroutine for detecting an activation state of a catalyst performed by the controller.
Figure 6:
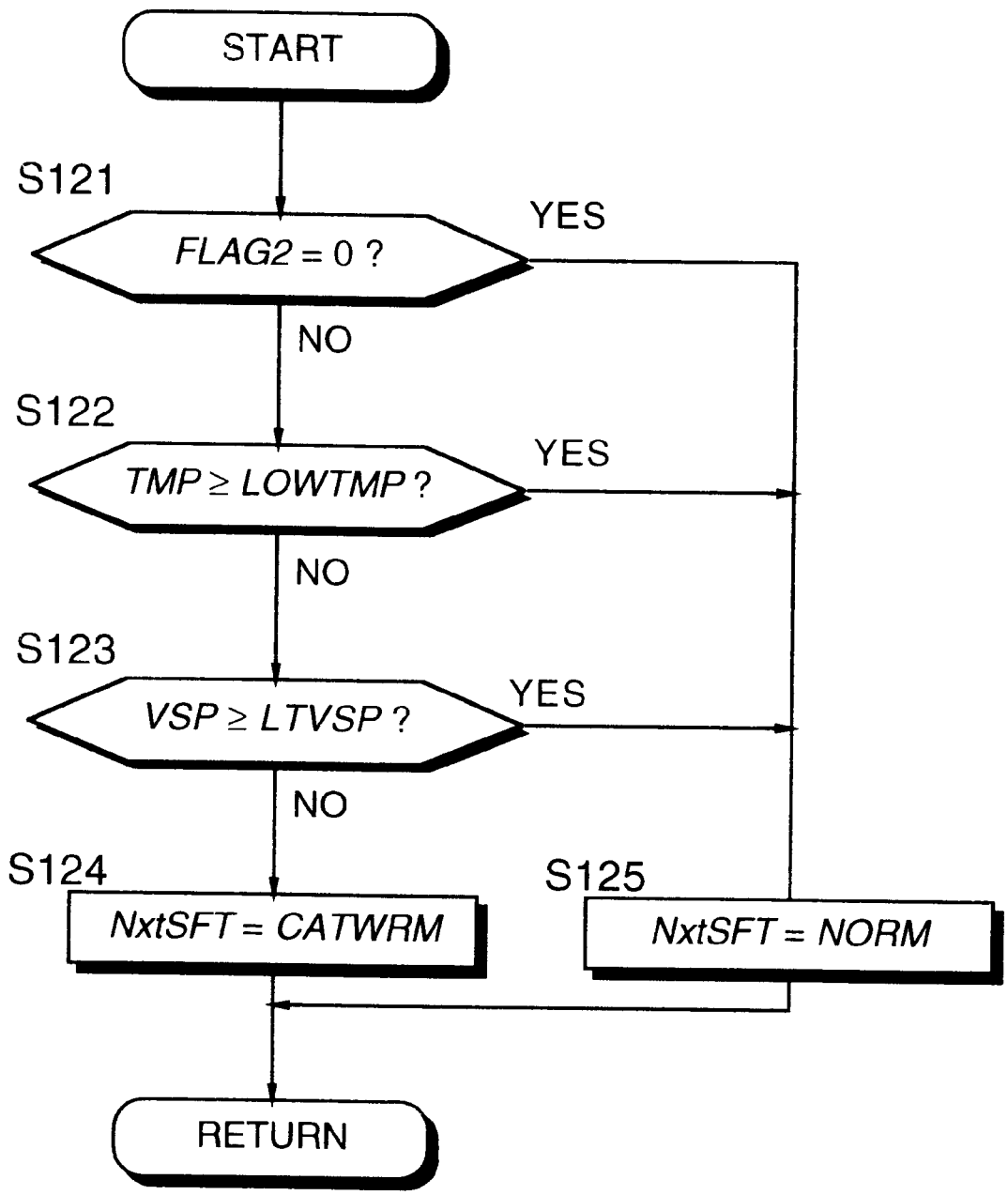
FIG. 6 is a flowchart describing a subroutine for selecting a speed change map performed by the controller.
Figure 7:
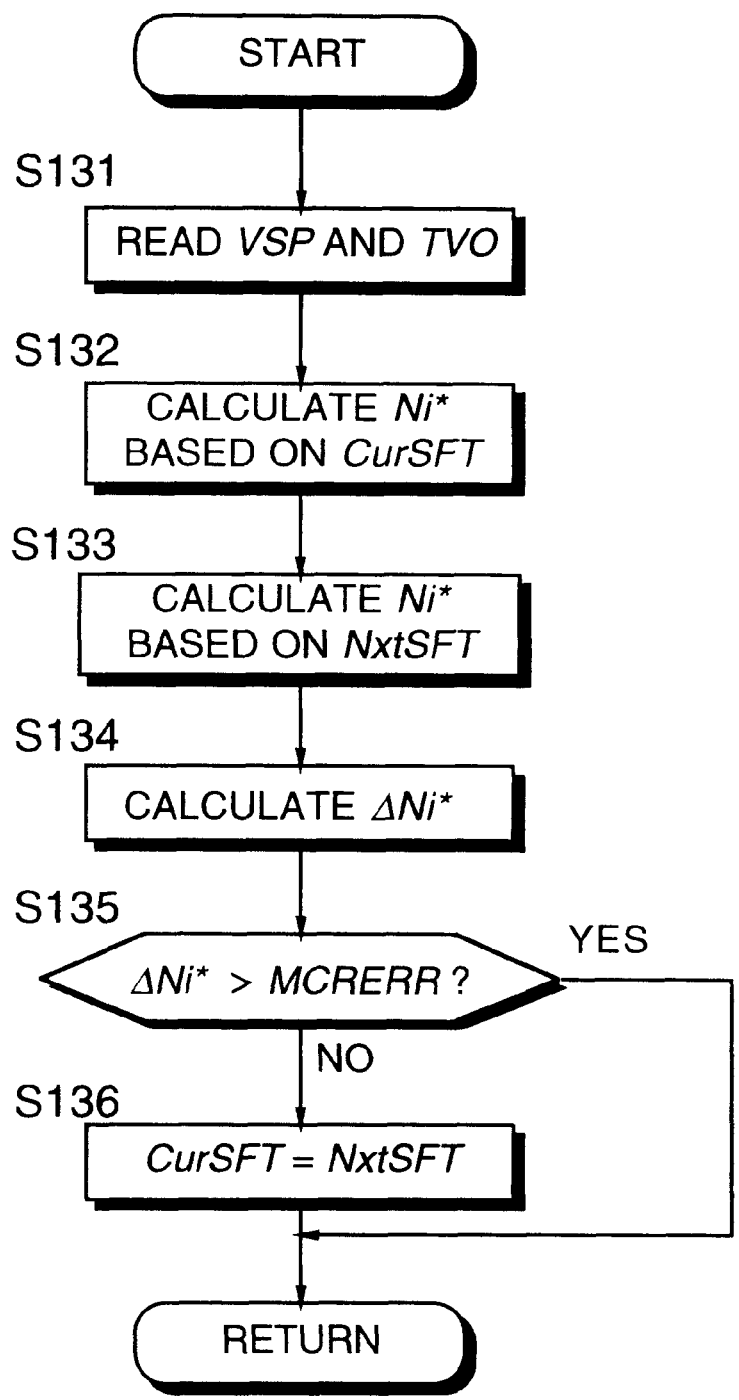
FIG. 7 is a flowchart describing a subroutine for determining a switching over condition of the speed change map performed by the controller.

Before the execution of the main routine of FIG. 4, the controller 61 executes the subroutines of FIGS. 5–7.

The subroutine of FIG. 5 is for the determination of an activation state of the catalyst.

As described earlier, the catalytic converter is interposed in the exhaust pipe of the engine. The catalyst in the catalytic converter does not activate until its temperature rises to a predetermined temperature and when it is not activated, it can not purify the toxic components of the exhaust gas. When the engine is cold, therefore, the controller 61 increases the engine rotation speed by switching over the speed change map so as to raise the exhaust gas temperature and promote the activation of the catalyst. This subroutine has been prepared to assess the necessity of this control. This subroutine is equivalent to the function of the catalyst activation determining unit 71A.

First, in a step S101, the subroutine determines whether or not a count start flag FLAG1 has been reset to 0. The count start flag FLAG1 shows whether or not counting of a timer value ELTTMR has been started. The timer value ELTTMR denotes an elapsed time after the engine start up. Therefore, when this subroutine is performed for the first time, the count start flag FLAG1 is 0 and the subroutine proceeds to a step S102.

In the step S102 and a following step S103, it is determined if the engine has been started up. In the step S102, the engine rotation speed Ne is compared with a standard engine rotation speed ELTREV for engine start up. When the engine rotation speed Ne does not exceed the standard engine rotation speed ELTREV, the vehicle speed VSP is compared with a standard vehicle speed ELTVSP in a step S103. When the engine rotation speed Ne exceeds the standard engine rotation speed ELTREV or when the vehicle speed VSP exceeds the standard vehicle speed ELTVSP, the subroutine proceeds to a step S104.

In the step S104, the timer value ELTTMR representing the elapsed time after engine start up is set equal to a set value TMRst which is determined according to the oil temperature TMP, and the count start flag FLAG1 is set to 1.

The set value TMRst is for example four minutes when the oil temperature TMP is 30° C. A map prescribing the relation between the oil temperature TMP and the set value TMRst is previously stored in the controller 61 and the set value TMRst is determined by looking up the map. The timer value ELTTMR decreases at every occasion when the subroutine is performed and it becomes 0 when the elapsed time after engine start up reaches the set value TMRst.

After performing the process of the step S104, the subroutine proceeds to a step S105, where an engine low temperature flag FLAG2 is set to 1 and the subroutine is terminated. The engine low temperature flag FLAG2 is set to 1 when the engine temperature is low and reset to 0 when the engine temperature is high enough to consider that the catalyst has been activated.

On the other hand, when the vehicle speed VSP was determined not to be exceeding the standard value ELTVSP, the subroutine skips the step S104, performs the process of the step S105 and is terminated. In other words, the engine low temperature flag FLAG2 is set to 1 even when the engine has not been started up.

Due to the process in the steps S102 and S103, the count start flag FLAG1 is found to be 1 in the step S101 only after the engine is started up.

When the count start flag FLAG1 is found to be 1 in the step S101, the subroutine proceeds to a step S106 and subsequent steps where the engine low temperature flag FLAG2 is set or reset depending on a determination whether or not the engine has stalled.

In the step S106, it is determined whether or not there is an abnormality in the engine rotation speed sensor 68 based on the signals input therefrom.

When the engine rotation speed sensor 68 is found to be normal, the subroutine proceeds to a step S107 and the determination is made as to whether or not the engine rotation speed Ne exceeds the standard engine rotation speed ELTREV. When the engine rotation speed Ne exceeds the value ELTREV, the engine is determined not to be stalled, and the subroutine proceeds to a step S109.

On the other hand, when any abnormality is found in the sensor 68 in the step S106, the subroutine skips the process of the step S107 and proceeds to a step S108. Since the process of the step S107 is performed based on the engine rotation speed Ne, this step is useless when the sensor 68 is defective. This is the reason why the step S107 is not performed when the any abnormality is found in the step S106.

In the step S108, the determination is made as to whether or not the vehicle speed VSP exceeds the standard vehicle speed ELTVSP. When the vehicle speed VSP is larger the standard value ELTVSP, it is determined that the engine has not stalled, and the subroutine proceeds to a step S109.

In the step S109, it is determined if the timer value ELTTMR which denotes the elapsed time after engine start up is 0. When the timer value ELTTMR is 0, it is determined that the activation of the catalyst is complete, the engine low temperature flag FLAG2 is reset to 0 in a step S 111 and the subroutine is terminated.

When on the other hand the timer value ELTTMR is not 0 in the step S109. it is determined that the activation of the catalyst is not yet complete, the engine low temperature flag FLAG2 is set to 1 in the aforesaid step S111, and the subroutine is terminated.

When the vehicle speed VSP is equal to or lower than the standard value ELTVSP in the step S108, it is determined that engine has stalled. In this case, the timer value ELTTMR and the count start flag FLAG1 are reset to 0 in a step S110, the engine low temperature flag FLAG2 is set to 1 in the step S105 and the subroutine is terminated.

By performing the above subroutine, therefore, the determination is make as to whether or not the activation of the exhaust gas purification catalyst has been completed, based on the oil temperature TMP at engine start up and the elapsed time ELTTMR after the engine start up.

FIG. 6 shows a subroutine for selecting the speed change map according to the result of the determination with respect to the catalyst activation. This subroutine is equivalent to the function of the speed change map selecting unit 71B and is performed subsequent to the subroutine of FIG. 5.

First, in a step S121, it is determined if the engine low temperature flag FLAG2 is 0, i.e., if the catalyst has been activated.

When the engine low temperature flag FLAG2 is 0, it is determined that the catalyst has been activated and the subroutine proceeds to a step S125.

When the engine low temperature flag FLAG2 is not 0, the catalyst has not been activated, the subroutine proceeds to a step S122 where the present oil temperature TMP of the transmission is compared with a standard oil temperature LOWTMP. When the oil temperature TMP has reached the standard temperature LOWTMP, despite the determination result of the step S121, it is determined that the catalyst has been activated, and the subroutine proceeds to the step S125. When the oil temperature TMP is lower than the standard temperature LOWTMP in the step S122, the vehicle speed VSP is compared with a reference speed LTVSP in a step S123. When the vehicle speed VSP has reached the reference speed LTVSP, the catalyst is determined to be active and the subroutine proceeds to the step S125. When the vehicle speed VSP is lower than the reference speed LTVSP, the subroutine proceeds to a step S124.

In the step S124, the speed change map of FIG. 13, herein designated as CATWRM, is set as a speed change map to be selected NxtSFT. On the other hand, in the step S125, the speed change map of FIG. 12, herein designated NORM, is set as a speed change map to be selected NxtSFT. These maps are previously stored in the controller 61.

Comparing the speed change map of FIG. 13 for catalyst activation with the speed change map of FIG. 12 for normal running, the former gives a higher input rotation speed Ni than the latter in a low speed range of VSP≦60 km/h and in a low engine load range of TVO≦1.5/8. In other words, the speed change map of FIG. 13 renders larger speed ratios in these ranges than the speed change map of FIG. 12. Coasting lines in the two maps which are the lines corresponding to TVO=0/8 are set to be identical in order to prevent undesired speed change operation of the transmission and the resultant action of engine brake when the map is switched over from one to another.

When the map for catalyst activation is applied, the engine rotation speed rises to as much as 2,000 rpm even under the vehicle running condition where both the vehicle speed and engine load are low. The catalyst is thereby activated in a short time.

FIG. 7 shows a subroutine for determining a switching over condition of the speed change map. This subroutine is equivalent to the switching over determination unit 71C in FIG. 3 and is performed subsequent to the subroutine of FIG. 6.

First, in a step S131, the vehicle speed VSP and throttle opening TVO are read.

In a following step S132, the final input rotation speed Ni* is calculated based on an active speed change map CurSFT.

In a step S133, the final input rotation speed Ni* is calculated based on the speed change map to be applied NxtSFT.

In a step S134, the difference ΔNi* between the two final input rotation speeds Ni* is calculated.

In a step S135, the difference ΔNi* is compared with the standard deviation MCRERR. When the difference ΔNi* is less than or equal to the standard deviation MCRERR, switching over of the maps is determined to be appropriate, the speed change map to be applied NxtSFT is set as the active speed change map CurSFT in a step S136, and the subroutine is terminated.

When on the other hand the difference ΔNi* is larger than the standard deviation MCRERR, switching over of the maps is determined to be inappropriate and the subroutine is immediately terminated without proceeding to the step S136.

By performing this subroutine, therefore, even when a speed change map different from the currently active map is selected in the subroutine of FIG. 6, the switching over of the maps is not conducted until the difference ΔNi* of the final target input rotation speeds Ni* becomes less than or equal to the standard deviation MCRERR.

The main routine of FIG. 4 will now be described. This main routine is performed after the above subroutines are performed.

The main routine calculates in a step S91 the transient target speed ratio RatioO.

In order to perform this calculation, the calculation of the final target input rotation speed Ni* and the final speed ratio i* are previously calculated by using the active speed change map. This step S91 is therefore equivalent to the function of the final input rotation speed calculation unit 72, final target speed ratio computing unit 73 and transient target speed ratio calculating unit 75 in FIG. 3.

Figure 8:
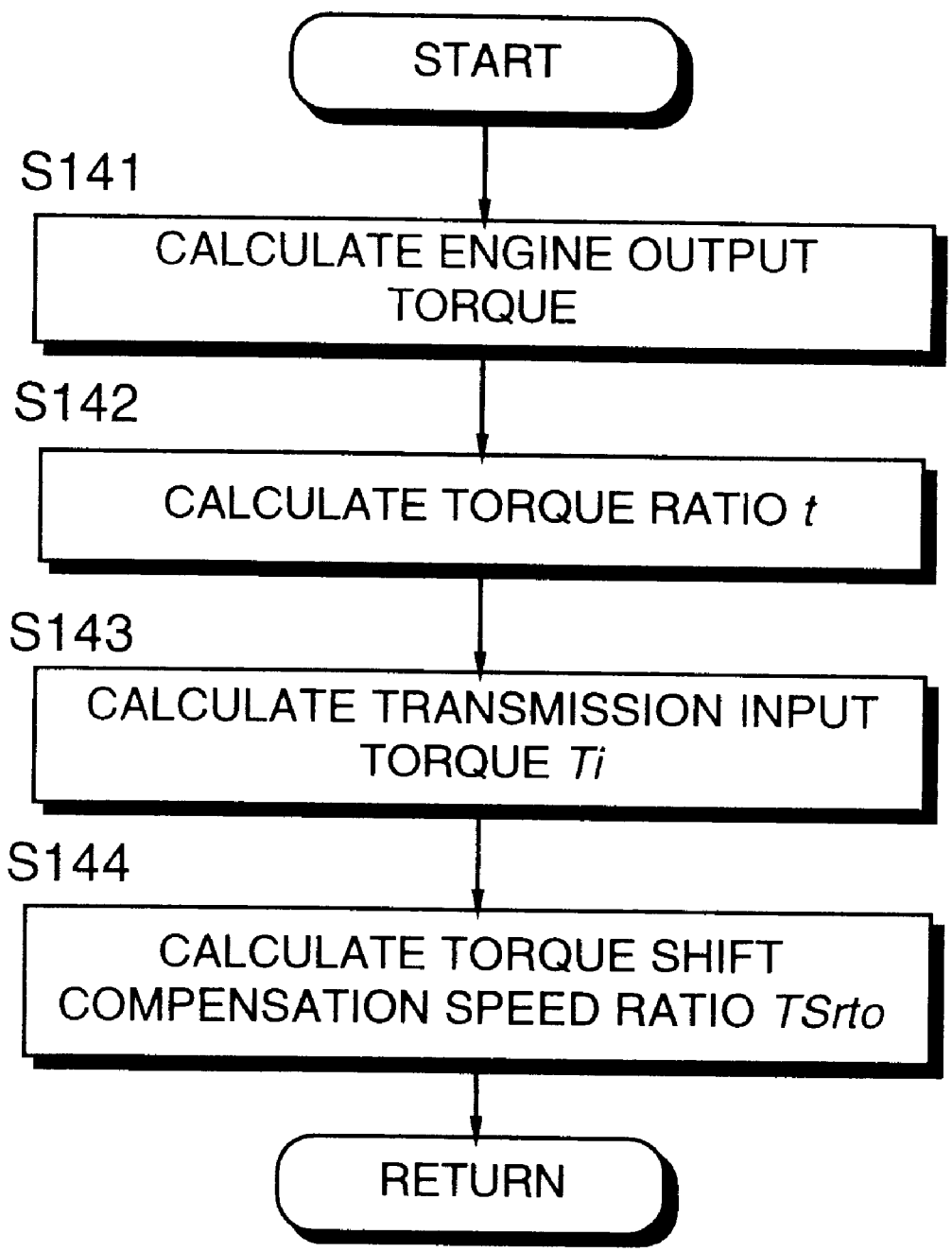
FIG. 8 is a flowchart describing a subroutine for calculating a torque shift performed by the controller.

In a step S92, the subroutine shown in FIG. 8 is used to calculate the torque shift compensated speed ratio TSrto.

This subroutine is equivalent to the function of the input torque calculating unit 76 and the torque shift compensation speed ratio calculating unit 77 of the block diagram of FIG. 3.

Describing this subroutine, in a step S141, the engine output torque is first calculated from the throttle opening TV0 and the engine speed Ne referring to an engine performance map stored beforehand in the controller 61.

In a step S142, the torque ratio t which is the ratio of the input rotation speed and output rotation speed of the torque converter is calculated.

In a step S143, the engine output torque is multiplied by torque ratio t to calculate the transmission input torque Ti.

In a step S144, the torque shift compensation speed ratio TSrto is calculated from the transmission input torque Ti and the transient target speed ratio Ratio0 which was found in the step S91 of the main routine, by looking up the map stored beforehand in the controller 61. After calculating the torque shift compensated speed ratio TSrto by the above subroutine, the main routine proceeds to a step S93 where the speed ratio feedback correction amount FBrto is calculated.

This calculation is performed by the subroutines of FIGS. 9–11 described later.

In a step S94, the compensated transient target speed ratio DsrRTO is computed by the following equation.

This is equivalent to the function of the adder 85 in the block diagram of FIG. 3.

$$DsrRTO = RatioO + TSrto + FBrto$$

where,

Ratio0=transient target speed ratio,

TSrto=torque shift compensated speed ratio, and

FBrto=speed ratio feedback correction amount.

In a following step S95, the target number of steps DsrSTP of the step motor 4 for attaining the compensated transient target speed ratio DsrRTO is calculated by looking up the map as mentioned above. This step is equivalent to the function of the target step number calculating unit 86 in the block diagram of FIG. 3.

In a following step S96, the physical operating limit rate of the step motor 4 is determined based on the oil temperature TMP of the transmission. This step is equivalent to the function of the step motor drive rate determining unit 88 in the block diagram of FIG. 3.

In a final step S97, the command signal Astep is calculated by correcting the target step number DsrSTP calculated in the step S95 based on the physical operating limit rate determined in the step S96. This signal Astep is output to the step motor 4, and the main routine is terminated. This step is equivalent to the function of the step motor drive position command calculating unit 87 in the block diagram of FIG. 3.

Next, the subroutine of FIGS. 9–11 will be described.

Figure 9:
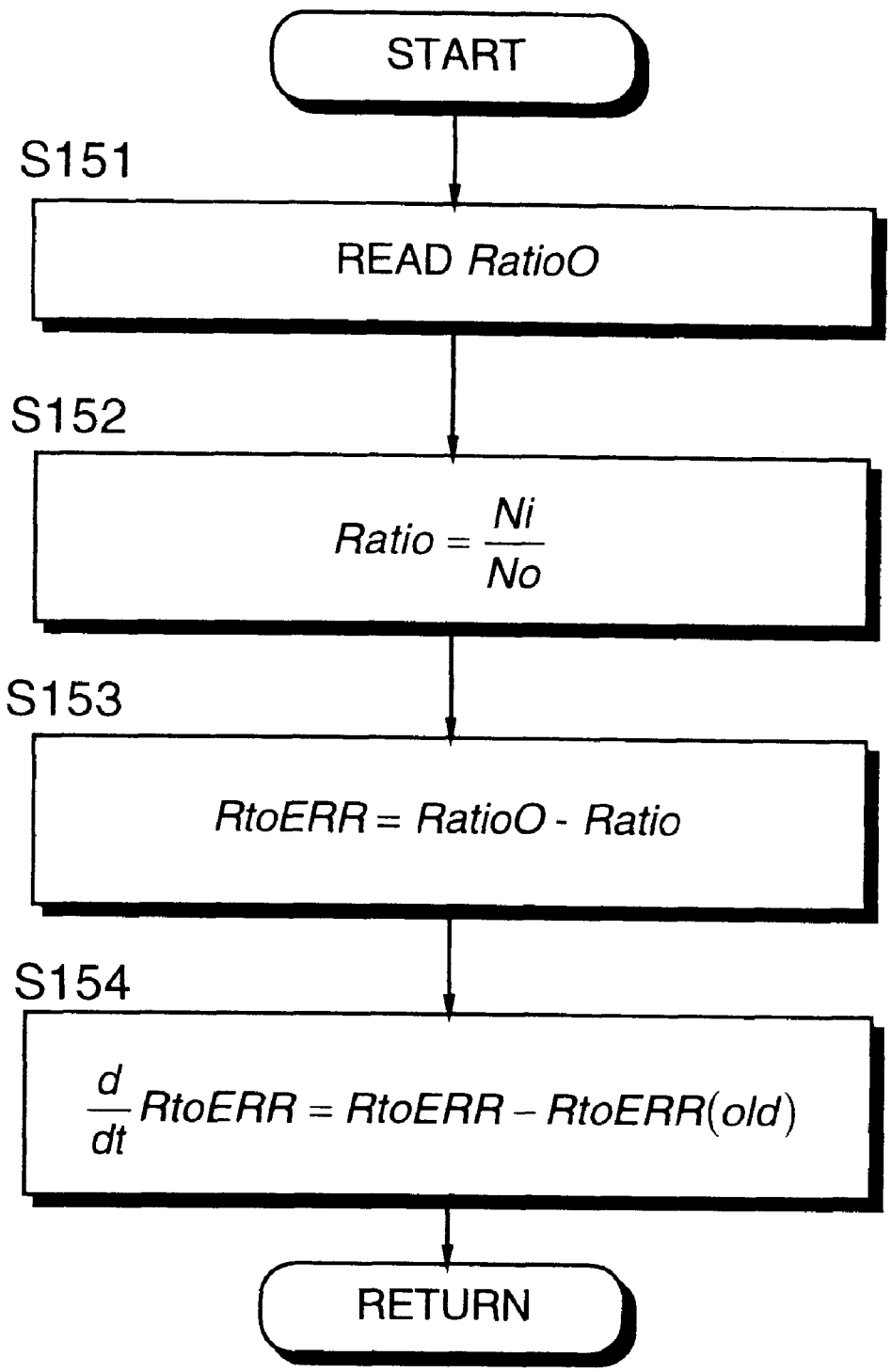
FIG. 9 is a flowchart describing a subroutine for calculating a speed ratio deviation performed by the controller.

FIG. 9 shows a subroutine for calculating the speed ratio deviation RtoERR.

This subroutine is equivalent to the function of the real speed ratio calculating unit 78 and the speed ratio deviation calculating unit 79 in the block diagram of FIG. 3.

First, the transient target speed ratio RatioO is read in a step S151.

In a step S152, the rotation speed Ni of the input disk 1 is divided by the rotation speed No of the output disk 2 to calculate the real speed ratio Ratio of the continuously variable transmission.

In a step S153, the real speed ratio Ratio is deducted from the transient target speed ratio RatioO to calculate the speed ratio deviation RtoERR.

Further, in a step S154, a deviation between the speed ratio deviation RtoERR and the speed ratio deviation RtoERR(old) calculated on the immediately preceding occasion the routine was executed, i.e., 10 milliseconds before, is calculated as a differential value of speed ratio deviation, $$\frac{d}{dt} RtoERR.$$

Figure 10:
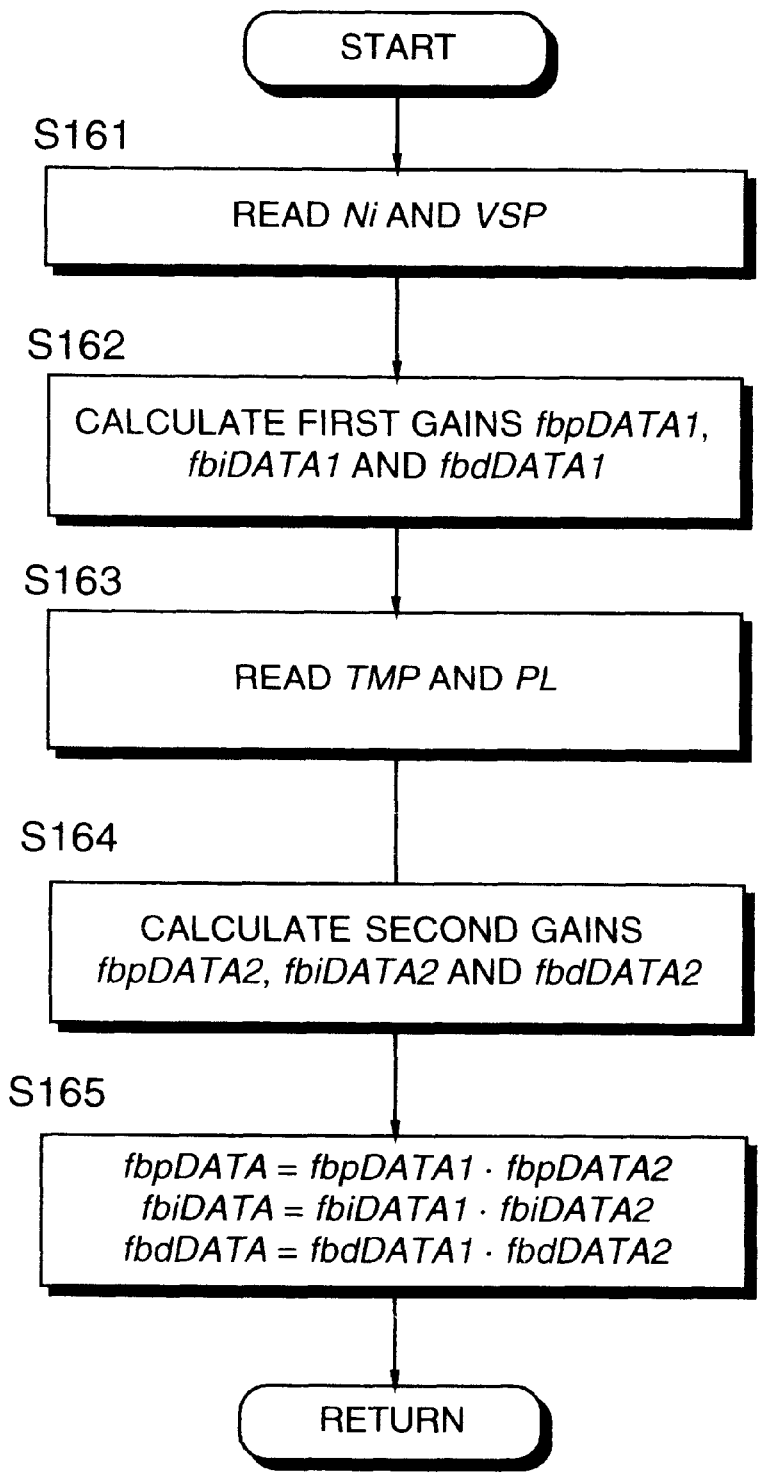
FIG. 10 is a flowchart describing a subroutine for calculating a feedback gain performed by the controller.

FIG. 10 shows a subroutine which calculates the PID control feedback gain. This subroutine is equivalent to the functions of the first feedback gain calculating unit 80, the second feedback gain calculating unit 81 and the feedback gain calculating unit 83 in the block diagram of FIG. 3.

Describing this subroutine, first in a step S161, the vehicle speed VSP and a rotation speed Ni of the input disk 1 of the continuously variable transmission are read.

In a step S162, a first proportional control feedback gain fbpDATA1, first integral control feedback gain fbiDATA1 and first differential control feedback gain fbdDATA1 are calculated by looking up the maps stored beforehand in the controller 61 as mentioned above based on VSP and Ni.

In a step S163, the oil temperature TMP and the line pressure $P_L$ are read.

In a step S164, a second proportional control feedback gain fbpDATA2, second integral control feedback gain fbiDATA2 and second differential control feedback gain fbdDATA2 are calculated by looking up the maps stored beforehand in the controller 61 as mentioned above based on TMP and $P_L$.

In a step S165, the proportional control feedback gain fbpDATA, integral control feedback gain fbiDATA and differential control feedback gain fbdDATA are calculated by multiplying the first gains by corresponding second gains.

Figure 11:
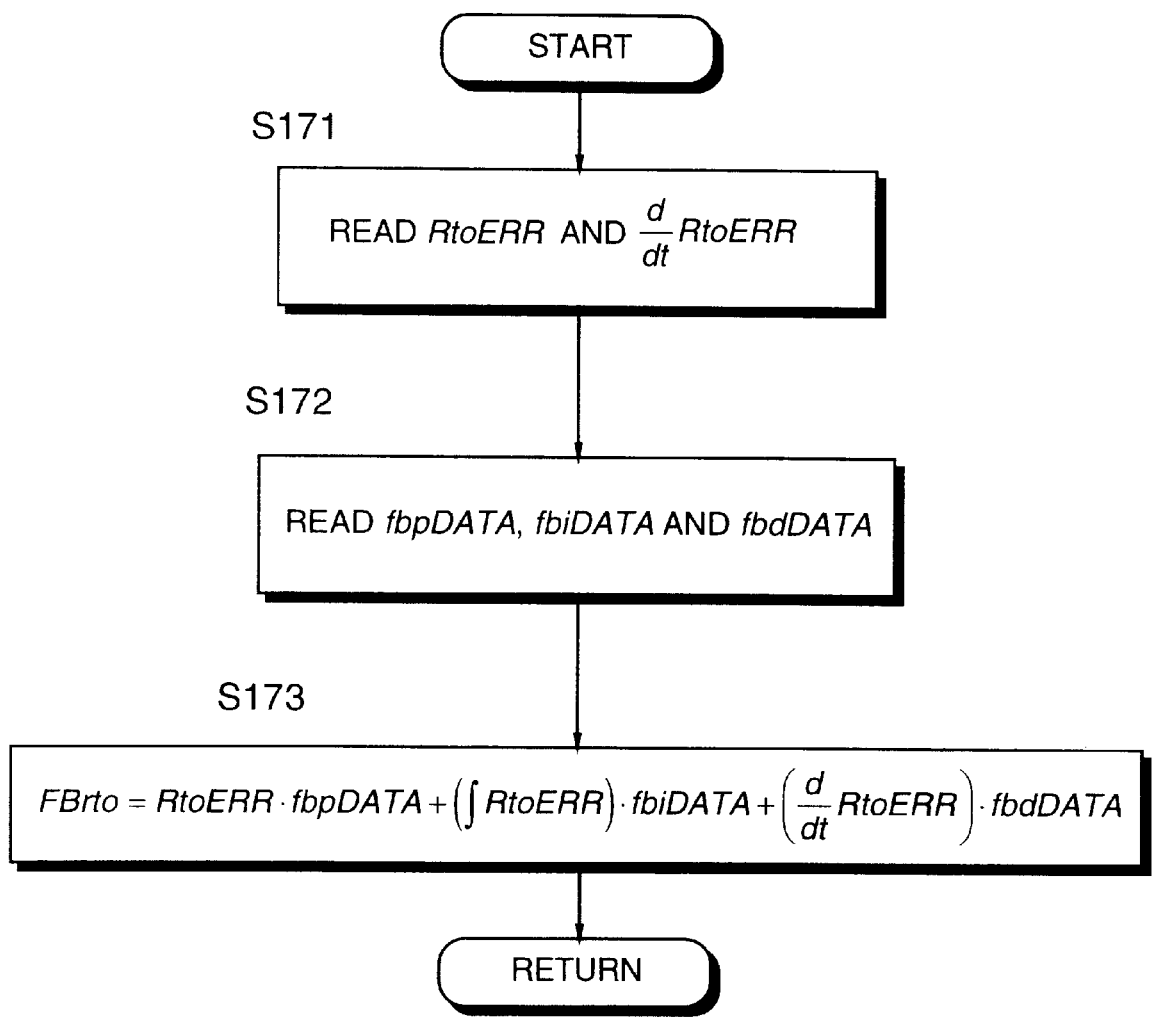
FIG. 11 is a flowchart describing a subroutine for the calculating a speed ratio feedback correction amount performed by the controller.

FIG. 11 shows a subroutine for calculating the speed ratio feedback correction amount FBrto due to PID control.

This subroutine is equivalent to the functions of the PID control unit 84 in the block diagram of FIG. 3.

In this subroutine, in a step S171, the speed ratio deviation RtoERR and its differential value $$\frac{d}{dt} RtoERR,$$

both of which were calculated by the subroutine of FIG. 9, are read.

In a next step S172, the feedback gains fbpDATA, fbiDATA and fbdDATA which were found in the subroutine of FIG. 10, are read.

In a step S173, the speed ratio feedback correction amount FBrto is calculated by the following equation.

$$FBrto = RtoERR \cdot fbpDATA + \left(\int RtoERR\right) \cdot fbiDATA + \left(\frac{d}{dt} RtoERR\right) \cdot fbdDATA$$

The contents of Tokugan Hei 10-1209783, with a filing date of Jul. 24, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the above embodiments describe the application of this invention to a toroidal continuously variable transmission, but it may applied to a V-belt continuously variable transmission.

What is claimed is:

1. A speed ratio controller for a continuously variable transmission of a vehicle, said vehicle being provided with an engine responsive to an operation of a throttle and with a catalyst for purifying exhaust gas of said engine, said catalyst being activated at a temperature higher than a predetermined catalyst temperature, and said continuously variable transmission transmitting a rotation of said engine to a drive wheel at an arbitrary speed ratio, said controller comprising:

a sensor for detecting an activation of said catalyst,
a sensor for detecting an engine load,
a sensor for detecting a vehicle speed, and
a microprocessor programmed to:
select a first speed change map when said catalyst is activated, said first speed change map defining a speed ratio according to said vehicle speed and engine load,
select a second speed change map when said catalyst is not activated, said second map defining a larger speed ratio than the speed ratio defined in said first speed change map in a range where the vehicle speed is lower than a predetermined vehicle speed and the engine load is lower than a predetermined engine load, and
control the speed ratio of said continuously variable transmission based on a selected speed change map,
wherein said engine load detecting sensor comprises a sensor for detecting an opening of said throttle, and said microprocessor is further programmed to use said opening of said throttle as said engine load,
wherein a relation between the vehicle speed and the speed ratio in said second map for at least one predetermined throttle opening, is set to be identical to a relation between the vehicle speed and the speed ratio in said first speed change map at said at least one predetermined throttle opening.

2. A speed ratio controller for a continuously variable transmission of a vehicle, said vehicle being provided with an engine responsive to an operation of a throttle and with a catalyst for purifying exhaust gas of said engine, said catalyst being activated at a temperature higher than a predetermined catalyst temperature, and said continuously variable transmission transmitting a rotation of said engine to a drive wheel at an arbitrary speed ratio, said controller comprising:

a sensor for detecting an activation of said catalyst,
a sensor for detecting an engine load,
a sensor for detecting a vehicle speed, and
a microprocessor programmed to:
select a first speed change map when said catalyst is activated, said first speed change map defining a speed ratio according to said vehicle speed and engine load,
select a second speed change map when said catalyst is not activated, said second map defining a larger speed ratio than the speed ratio defined in said first speed change map in a range where the vehicle speed is lower than a predetermined vehicle speed and the engine load is lower than a predetermined engine load, and
control the speed ratio of said continuously variable transmission based on a selected speed change map,
wherein said predetermined vehicle speed is set equal to 60 km/hr.

3. A speed ratio controller for a continuously variable transmission of a vehicle, said vehicle being provided with an engine responsive to an operation of a throttle and with a catalyst for purifying exhaust gas of said engine, said catalyst being activated at a temperature higher than a predetermined catalyst temperature, and said continuously variable transmission transmitting a rotation of said engine to a drive wheel at an arbitrary speed ratio, said controller comprising:

a sensor for detecting an activation of said catalyst,
a sensor for detecting an engine load,
a sensor for detecting a vehicle speed, and
a microprocessor programmed to:
select a first speed change map when said catalyst is activated, said first speed change map defining a speed ratio according to said vehicle speed and engine load,
select a second speed change map when said catalyst is not activated, said second map defining a larger speed ratio than the speed ratio defined in said first speed change map in a range where the vehicle speed is lower than a predetermined vehicle speed and the engine load is lower than a predetermined engine load, and control the speed ratio of said continuously variable transmission based on a selected speed change map, wherein said microprocessor is further programmed to calculate, when said catalyst is activated, a first target engine rotation speed by using said first speed change map and a second target engine rotation speed by using said second speed change map, and further programmed not to apply said first speed change map for controlling the speed ratio of said transmission when a difference between said first target engine rotation speed and said second target engine rotation speed is larger than a predetermined standard deviation.

4. A speed ratio controller for a continuously variable transmission of a vehicle, said vehicle being provided with an engine responsive to an operation of a throttle and with a catalyst for purifying exhaust gas of said engine, said catalyst being activated at a temperature higher than a predetermined catalyst temperature, and said continuously variable transmission transmitting a rotation of said engine to a drive wheel at an arbitrary speed ratio, said controller comprising:

a sensor for detecting an activation of said catalyst, a sensor for detecting an engine load, a sensor for detecting a vehicle speed, and a microprocessor programmed to:

select a first speed change map when said catalyst is activated, said first speed change map defining a speed ratio according to said vehicle speed and engine load, select a second speed change map when said catalyst is not activated, said second map defining a larger speed ratio than the speed ratio defined in said first speed change map in a range where the vehicle speed is lower than a predetermined vehicle speed and the engine load is lower than a predetermined engine load, and control the speed ratio of said continuously variable transmission based on a selected speed change map, wherein said transmission is designed to change the speed ratio according to a pressure of oil, said catalyst activation detecting sensor comprises a sensor for detecting a temperature of said oil, and said microprocessor is further programmed to determine that said catalyst has been activated when a predetermined time is elapsed after said temperature of said oil has risen to a predetermined oil temperature, wherein said predetermined oil temperature is set equal to 30° C. and said predetermined time is set equal to four minutes.

* * * * *